United States Patent Office 3,784,569
Patented Jan. 8, 1974

3,784,569
V-TRIAZOLYL COUMARINS
Rudolf Kirchmayr, Binningen, Hansjörg Heller, Riehen, and Jean Rody, Basel, Switzerland, assignors to Ciba-Geigy AG, Basel, Switzerland
No Drawing. Filed Feb. 12, 1968, Ser. No. 704,590
Claims priority, application Switzerland, Feb. 16, 1967, 2,319/67
Int. Cl. C09d 99/04; C09k 1/02
U.S. Cl. 260—308 A          11 Claims

ABSTRACT OF THE DISCLOSURE 3-aryl-7-(v-triazolyl)-coumarins in which the triazolyl moiety is of the formula and A represents an optionally alkyl-substituted tetramethylene group or an optionally alkyl-substituted o,ω-phenylmethylene or o,ω-phenylethylene group the benzene ring of which may be non-chromogenically substituted, are useful as optical brighteners for a great variety of organic materials, e.g. nylon, polyethylene glycol type polyester, polyamide, cellulosic fiber materials, and the like. A method for optically brightening such organic materials, with the aid of the new compounds, and compositions, especially detergent compositions, containing them as optically brightening ingredients, are also described.

DETAILED DISCLOSURE

The present invention concerns new coumarins which are substituted in the 3-position and contain a v-triazolyl-(2) radical in the 7-position, processes for their production, their use for the optical brightening of organic material as well as, an industrial product, material and textile auxiliaries containing these coumarins which are brightened thereby.

3-phenyl coumarins substituted by a 4,5-areno-v-triazolyl-(2) radical in the 7-position have already been suggested as optical brighteners for organic material. However, these optical brighteners emit a fluorescence having an undesirable greenish tinge or their self-color is too strongly yellow so that in higher dosages the brightened organic material is given a greenish appearance which greatly diminishes their visual whiteness. In addition, these products have relatively poor fastness to light on polyamide and polyester fibres which are so important in the textile industry and, on longer exposure, the material optically brightened therewith becomes clearly more yellow in color.

Also 3-phenyl coumarins containing a 4,5-areno-v-triazolyl-(2) group in the p-position of the 3-phenyl radical have been suggested as optical brighteners for textiles. These products, however, have only a weak and greenish fluorescence. They are unsuitable to attain a brilliant optical brightening effect and, therefore, have not become of industrial importance up to the present. The equally known 3-phenyl coumarins containing a v-triazolyl-(1) group in the 7-position also produce insufficient white effects.

It has now been found that the new class of v-triazolyl coumarins of Formula I surprisingly embraces more valuable substances which can be used as optical brighteners.

(I)

In this formula

A represents a tetramethylene group optionally substituted by lower alkyl groups or an o,ω-phenyl-alkylene group wherein the alkylene moiety has from 1 to 2 straight chain carbon atoms, and optionally contains lower alkyl groups, but the total of carbon atoms of the alkylene moiety preferably does not exceed four, and the benzene ring of which phenylalkylene group is optionally non-chromogenically substituted, preferred substituents being halogen, especially chlorine, and/or alkyl;

Y represents a mononuclear carbocyclic or heterocyclic aryl group conjugated with the coumarin ring, preferably a phenyl radical, a furyl or a thienyl radical;

$R_1$ and $R_4$ independently of each other represent hydrogen or a lower alkyl group, preferably the former, and $R_2$ and $R_3$ independently of each other represent hydrogen, a lower alkyl or lower alkoxy group.

These compounds have low intrinsic color, i.e. slight absorption of light in the visible part of the spectrum and in daylight have an intensive blue-violet to violet fluorescence; they have considerably better fastness to light than comparable compounds of the prior art. These advantageous properties, combined with a good tolerance in various organic substrates, make the new substances valuable optical brighteners for the most different types of organic materials.

The radical A of Formula I represents in particular a tetramethylene group optionally substituted by low alkyl groups, e.g. the tetramethylene group, 1-methyl-tetramethylene group or the 1,3-dimethyl-tetramethylene group, or they represent an o,ω-phenyl-methylene group or an o,ω-phenylethylene group optionally bearing lower alkyl groups in the alkylene moiety, the benzene ring of which o,ω-phenylethylene group can be non-chromogenically substituted e.g. by sulphonic acid groups, halogen, lower alkyl or lower alkoxy groups.

The substituents $R_1$ and $R_4$ are preferably hydrogen, the substituents $R_2$ and $R_3$ in Formula I, in preferred optical brighteners, represent especially hydrogen, further methyl or methoxy.

The mononuclear carbocyclic or heterocyclic aryl group Y is preferably an unsubstituted or non-chromogenically substituted phenyl radical. It can contain, for example, the following non-chromogenic substituents: alkyl groups such as methyl, ethyl, propyl, isopropyl, n-butyl groups; halogens such as fluorine, particularly however chlorine, or also bromine; alkoxy groups such as methoxy, ethoxy, propoxy, butoxy groups; alkylene or alkylene ether groups bound at positions adjacent to the benzene ring such as tetramethylene or methylenedioxy groups; also sulphonic acid groups, sulphamide groups and sulphamide groups substituted at the nitrogen atom, e.g. optionally substituted N-alkyl-sulphamoyl and N,N-dialkyl-sulphamoyl groups such as N-methyl-, N-ethyl-, N-butyl-, N-hydroxyethyl-, N-methoxyethyl-, N-ethoxyethyl, N-dimethylaminoethyl-, N-dimethylaminopropyl-, N-diethylaminoethyl- sulphamoyl groups and N-dimethyl- and N-diethylsulphamoyl groups and morpholinosulphonyl groups; alkylsulphonyl groups such as methylsulphonyl, ethylsulphonyl, butylsulphonyl groups; carboxyl groups; carbalkoxy groups such as carboxylic acid methyl ester, ethyl ester, butyl ester, benzyl ester or cyclohexyl ester groups; carboxylic acid amide groups and carboxylic acid amide groups substituted at the nitrogen atom such as carboxylic acid ethylamide, diethylamide, monoethanolamide carboxylic acid-(3-methoxy-propylamide), carboxylic acid morpholide, carboxylic acid piperidide or carboxylic acid-(3-dimethylamino)-propylamide groups; also substituted alkyl groups such as

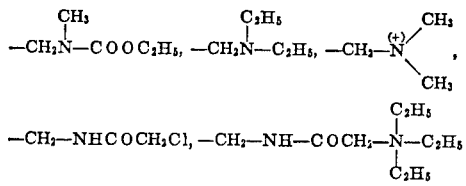

—CH$_2$—NHCOCH$_2$Cl, —CH$_2$—NH—COCH$_2$—N(C$_2$H$_5$)(C$_2$H$_5$)

Y can also be a furyl-(2) or a thienyl-(2) radical which can be substituted, e.g. by low alkyl groups such as the methyl group.

In particularly preferred compounds, A represents the tetramethylene group or the o,ω-phenylethylene group, and R$_1$, R$_2$, R$_3$, R$_4$ represent hydrogen and Y represents a phenyl, methylphenyl or a chlorophenyl radical.

The following are worthy of mention in providing particular properties in coumarin compounds according to the invention:

(a) Basic substituents, e.g. of aromatic rings or of functional groups, e.g. in carboxylic acid ester, carboxylic acid amide or sulphonic acid amide groups, such as dialkylamino, piperidino, morpholino, N-alkyl-piperazino groups, which substituents can be bound to carbocycles direct or, like the functional derivatives of acid groups mentioned, by way of alkylene radicals, cyclammonium groups such as the pyridinium acetyl group which can be bound to organic radicals direct or by way of imino groups or oxygen, because they lend to the new optical brighteners affinity to fibres made of acid modified polymers;

(b) Acid substituents, e.g. carboxyl, sulphonic acid and optionally alkylated, arylated or acylated sulphonic acid amide groups because they lend to the new optical brighteners affinity to natural and synthetic polyamide fibres;

(c) Hydroxyalkyl, cyanoalkyl and alkanoyloxyalkyl groups particularly as nitrogen substituents of amino or amide compounds because, in suitable linkage, the lend the coumarin compounds according to the invention affinity to high molecular polyester fibres.

v-Triazoles of Formula I according to the invention can be produced by different methods; preferably one of the methods A and B described below is followed

Method A

By method A, an oxime hydrazone of an α-diketone of Formula II

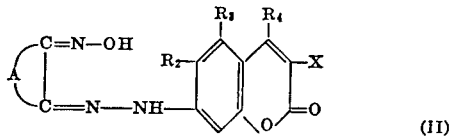

in which formula, the symbols A, R$_1$, R$_2$, R$_3$, R$_4$ and Y have the meanings given in Formula I, is condensed with protonic acids or by means of acid anhydrides while splitting off water and closing the ring, optionally with heating, to form compounds of Formula I.

Examples of cyclizing protonic acids are chiefly hydrohalic acids, examples of effective acid anhydrides are the inorganic anhydrides, phosphorus pentoxide and sulphur trioxide, the mixed inorganic/organic anhydrides such as the alkanoyl and aroyl, alkylsulphonyl and arylsulphonyl halides, e.g. acetyl chloride, benzoyl chloride, toluene sulphochloride, as well as the pure organic anhydrides such as acetanhydride, benzoic acid anhydride, also the mixed anhydride of formic and acetic acids.

The condensation can be performed in the presence of organic solvents which are inert under the reaction conditions. As such, high boiling hydrocarbons and halogenated hydrocarbons e.g. chlorobenzene, dichlorobenzenes, xylenes, can be used; also inert slightly or more strongly basic solvents can be used, e.g. dimethyl formamide, dimethyl acetamide, or pyridine, picolines, quinolines. Cyclization can be performed by simply allowing the reaction mixture to stand or by heating it, depending on the substituents of the oxime hydrazones. The reaction is performed at temperatures between room temperature and 250° C., preferably at 200° C. Sometimes the presence of basic catalysts such as anhydrous alkali and alkaline earth salts of organic acids, e.g. sodium or potassium acetate, produces favorable results with regard to yields and purity of the end products. The progress of ring closure can be best followed by thin layer chromatography. The occurrence of O-acylated intermediate products when mixed inorganic/organic or pure organic acid anhydrides are used has no great influence on the course of the reaction.

Starting materials usable according to the invention in method A are obtained by α-diketones

by reaction with, in any order desired, hydroxylamine on the one hand and a 7-hydrazino-3-aryl coumarin of General Formula III

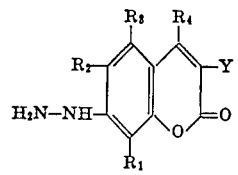

wherein R$_1$, R$_2$, R$_3$, R$_4$ and Y have the meanings given in Formula I, on the other.

Examples of suitable α-dicarbonyl compounds are: 1,2-cyclohexanedione, 3,5-dimethyl-cyclohexanedione or 1,2-indone-dione.

The monoximes or monohydrazones occurring as intermediates can be produced by methods known per se also from suitable methylene ketones

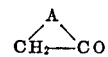

by introducing thereinto a nitroso group or by reaction with a diazonium compound corresponding as precursor to the hydrazino coumarin III. The isomers thus formed are of no importance to the structure of the end product.

Methylene ketones into which a nitroso group can be introduced are, e.g.: cyclohexanone, 3-methylcyclohexanone, 4-methylcyclohexanone, cyclopentanone, 1-indanone, 3-methyl-1-indanone, 5,6-methylenedioxy-1-indanone, 6-chloro-1-indanone, 5,6-dimethoxy-1-indanone, 1-tetralone (= 1-oxo-1,2,3,4-tetra-hydro-naphthalene), 4,6,7-trimethyl-1-tetralone, 4,6,8-trimethyl-tetralone.

A methylene ketone which can be coupled direct is, e.g. 1,2,3,4-tetrahydro-2-oxo-naphthalene.

When the methylene group in the methylene ketones

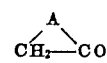

is not sufficiently capable of being coupled, the corresponding methine compounds can be used by methods known per se. These methine compounds contain an acyl or carboxy group instead of one of the hydrogen atoms of the methylene group which is displaced, with formation of the monohydrazone, on reaction with the diazonium compound.

Examples of such coupling components are: cyclohexanone-2-carboxylic acid and cyclopentanone-2-carboxylic acid.

In the production of the monohydrazones by coupling, the diazonium compounds used correspond to the General Formula IV.

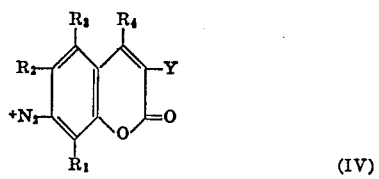

(IV)

wherein the symbols R₁, R₂, R₃, R₄ and Y have the meanings given in Formula I. The diazonium salts are produced in the usual way by diazotization of the corresponding amino coumarins. Suitable diazo components are, e.g.:

3-phenyl-7-amino coumarin,
3-phenyl-6-methyl-7-amino coumarin,
3-(3-methylphenyl)-7-amino coumarin,
3-(4-methylphenyl)-7-amino coumarin,
2-(3,4-dimethylphenyl)-7-amino coumarin,
3-(3-chlorophenyl)-7-amino coumarin,
3-(4-chlorophenyl)-7-amino coumarin,
3-(2,4-dichlorophenyl)-7-amino coumarin,
3-(3,4-dichlorophenyl)-7-amino coumarin,
3-(4-fluorophenyl)-7-amino coumarin,
3-sulphophenyl-7-amino coumarin,
3-thienyl-(2)-7-amino coumarin,
3-carboxy-7-amino coumarin,
3-(m-cyanophenyl)-7-amino coumarin,
3-(m-carboxyphenyl)-7-amino coumarin,
3-(m-methoxyphenyl)-7-amino coumarin.

Such amino coumarins can be produced, e.g. according to the processes described in Belgian Pat. No. 542,754 or Dutch application open for public inspection 6,511,305.

Method B

A second, advantageous process for the production of new coumarin compounds of Formula I consists in oxidizing the oxime hydrazones of α-diketones of General Formula II discussed in method A to form corresponding triazole oxides of Formula V

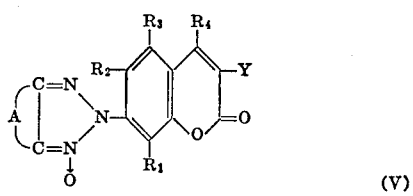

(V)

and reducing these triazole oxides by known methods to the triazole compound of Formula I. In these formulae too the symbols have the meanings given in Formula I.

The oxidative ring closure can be performed by the action of the most various oxidizing agents; it is recommended that cyclization be performed in solvents which are stable to oxidation. In acid, e.g. acetic acid, solution, bichromate or hydrogen peroxide can be used as oxidizing agents; in basic solvents such as pyridine or mixtures of pyridine and water, e.g. potassium ferricyanide can be used. The generally useful and, therefore, preferred process consists in oxidizing with copper-(II) sulphate in pyridine/water. It is not necessary to use stoichiometric amounts of copper because the monovalent copper formed in the reaction can be continuously converted into the divalent state during the reaction by bubbling in air or oxygen.

For the reduction of triazole oxides to triazoles by known methods, advantageously the reduction with base metals and acid is chosen, such as zinc dust in acetic acid or mixtures of acetic acid and water. However, salts of reducing acids of sulphur or phosphorus can also be used for the reduction.

Method C

Finally, 7-triazolyl-3-aryl coumarin compounds according to the invention of General Formula I are obtained by condensing a 2-hydroxy-4-triazolyl benzaldehyde of the General Formula VI

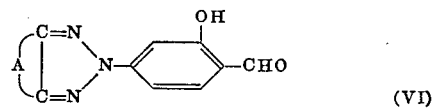

(VI)

wherein the symbol A has the meanings given in Formula I, or a derivative thereof which reacts in the same way as such benzaldehyde under the reaction conditions, with an optionally ring-substituted phenylacetic acid or with a functional derivative of this acid, the condensation being performed by known methods under cyclizing conditions.

v-Triazolyl-(2)-coumarins obtained according to the invention can contain a sulphonic acid group, a sulphamide group or a sulphamide group substituted at the nitrogen at the 3-phenyl radical. These groups can already be present in the starting materials such as in the 3-(3- or 4-sulpho- or sulphamoyl-phenyl)-7-amino coumarins. However, the sulpho group can often also be introduced in a simple way by sulphonation only after the condensation according to the invention to form the coumarin and modified into sulphonic acid amide groups by way of the acid chloride. The sulphochlorination can also be performed with chlorosulphonic acid.

The v-triazoles according to the invention of Formula I form colorless to yellowish crystalline substances. Ionogenically substituted products dissolved in water or polar organic solvents, and compounds not containing ionogenic groups dissolved in organic solvents, have an intensive blue to violet fluorescence. Incorporated into or drawn on to yellowed organic material by the usual methods, the new compounds give to such material a pure white appearance in daylight and are, therefore, valuable optical brighteners. Compared with known, comparable optical brighteners of the coumarin series, they are distinguished by better fastness to light, a more neutral white effect and, therefore, better color in artificial light, very good stability to the application temperatures as well as good stability to chemical bleachers such as chlorites, perborates and percarbonates.

They are suitable, therefore, as optical brighteners for substrates of the most various kinds, the preferred group of substrates being determined by the substitution. Thus, v-triazolyl coumarins containing sulphonic or carboxylic acids have good white effects on cellulose and polyamide materials such as cotton, viscose silk, staple fibre, nylon, polyamides based on caprolactam, wool and silk the polyamides preferably being brightened from an acid aqueous bath or in the spinning mass and the cellulose substrates being brightened from an acid to alkaline aqueous bath. Products having cationic character are particularly suitable for the brightening of polymeric and copolymeric acrylonitrile textile materials. Those v-triazolylcoumarins containing no ionogenic groups are, however, particularly suitable. These products are suitable for the optical brightening of high molecular, hydrophobic, organic material, chiefly for the brightening of synthetic organic polyplasts especially in the spinning melt, i.e. synthetic materials obtained by polymerization, e.g. polycondensation or polyaddition such as polyolefins, e.g. polyethylene or polypropylene, also polyvinyl chloride, chiefly however, of polyesters, particularly polyesters of aromatic polycarboxylic acids with polyvalent alcohols such as polyterephthalic acid glycol ethers, synthetic polyamides such as Nylon 6 and Nylon 66, also however, of cellulose esters such as cellulose acetates.

The high molecular hydrophobic organic material is optically brightened, e.g. by incorporating thereinto slight amounts of optical brighteners according to the invention, preferably 0.001 to 1% calculated on the material to be brightened, optionally together with other substances such as plasticizers, stabilizers or pigments. The brighteners can be incorporated into the synthetic materials, e.g. dissolved in plasticizers such as dioctyl phthalate, or together with stabilizers such as dibutyl tin dilaurate or sodium pentaoctyl tripolyphosphate, or together with pigments such as, e.g. titanium dioxide. Depending on the type of material to be brightened, the brightener can also be dissolved in the monomers before polymerization, in the polymer mass or, together with the polymers, in a solvent. The material so pre-treated is then made into the desired final form by known processes such as calendering, pressing, extruding, painting, casting and, chiefly, spinning and drawing. Also the brighteners can be incorporated into finishes, e.g. in finishes for textile fibres such as copolyvinyl alcohol, or in resins or resin precondensates such as methylol compounds of ethylene urea, which are used for the treatment of textiles.

Preferably however, high molecular organic material is brightened in the form of fibres. Advantageously an aqueous dispersion of v-triazoles according to the invention of Formula I is used for the brightening of these fibre materials. The brightener dispersion preferably contains 0.005–0.5% of v-triazole according to the invention, calculated on the fibre material. In addition, the dispersion can contain auxiliaries such as dispersing agents, e.g. condensation products of fatty alcohols or alkyl phenols having 10 to 18 carbon atoms with 15 to 25 mol of ethylene oxide, or condensation products of alkyl mono- or poly-amines having having 16 to 18 carbon atoms with at least 10 mol of ethylene oxide, organic acids such as formic, oxalic or acetic acid, detergents, carriers such as di- or tri-chlorobenzenes, wetting agents such as sulphosuccinic acid alkyl esters, bleachers such as sodium chlorite, peroxides or hydrosulphites, as well as, optionally, optical brighteners of other classes such as stilbene derivatives having affinity to cellulose.

The fibre material is brightened with the aqueous dispersion of brightener either by the exhaustion process at temperatures of, preferably, 30 to 150° C., or by the pad dyeing process. In the latter case, the goods are impregnated with, e.g. a 0.2–0.5% brightener dispersion and finished, e.g. by a dry or moist heat treatment, e.g. by steaming at 2 atm. or by a short heating, after dying, at 180–220°, optionally the fabric being simultaneously thermofixed. Finally, the fibre material so treated is rinsed and dried.

High molecular, organic material optically brightened according to the invention, particularly by the exhaustion process has a pleasant, pure white, blue-violet to blueish fluorescent appearance.

Also detergents can be optically brightened with v-triazoles according to the invention, e.g., soaps, soluble salts of higher fatty alcohol sulphates, higher and/or alkyl-polysubstituted aryl sulphonic acids, sulphocarboxylic acid esters of medium to higher alkanols, higher alkanoylaminoalkyl or alkanoylaminoaryl carboxylic or sulphonic acids, or fatty acid glycerin sulphates; also nonionoid detergents such as higher alkylphenol polyglycol ethers. Such washing agents containing v-triazoles of Formula I can also be used for the brightening of textiles.

Washing agents brightened according to the invention can contain the usual fillers and auxiliaries, e.g. alkali polyphosphates and polymetaphosphates, alkali silicates, alkali borates, alkali metal salts of carboxymethyl celluloses, foam stabilizers such as alkanolamides of higher fatty acids, or complex ones such as soluble salts of ethylenediamine tetra-acetic acid, as well as chemical bleachers such as perborates or percarbonates.

The new v-triazoles are incorporated into the washing agents or liquors advantageously in the form of their solutions in neutral, water miscible and/or easily volatile organic solvents such as low alkanols, low alkoxyalkanols or low aliphatic ketones. They can also be used, however, either alone or in admixture with dispersing agents, in a solid, finely distributed form. For example, they can be mixed, kneaded or milled with the wash-active substances and then the usual auxiliaries and fillers can be mixed in. For example, the optical brighteners are stirred with the wash-active substances, usual auxiliaries and carriers, and water to form a slurry and this is then sprayed from an atomizing drier. The new v-triazole derivatives can also be admixed with ready-for-use washing agents, e.g. by spraying a solution in an easily volatile and/or water soluble organic solvent onto the dry, circulating washing agent.

The content of optical brightener of Formula I in the washing agent is advantageously 0.001–0.5% calculated on the solid content of the washing agent. Compared with washing agents not containing optical brightener, those containing optical brighteners of Formula I often have a greatly improved white appearance in daylight.

On washing textile fibres, e.g. synthetic polyamide, polyester, polyolefin and cellulose ester fibres, with washing liquors containing v-triazoles according to the invention of Formula I, such fibres are given a brilliant appearance in daylight. They can be used, therefore, in particular for the washing of these synthetic fibres or of textiles or components of textiles made up of such fibres, and for the washing of personal linen. For use in the household wash, the washing liquors can also contain other optical brighteners having affinity to other fibres, e.g. to cellulose fibres.

Further details can be seen from the following examples. The temperatures are given in degrees centigrade. Parts and percentages are given by weight unless expressly stated otherwise. "Polyester fibers" means polyethylene glycol terephthalate fibers (e.g. Dacron).

EXAMPLE 1

(1.1) 2 - [3 - phenylcoumarinyl-(7)]-4,5-tetramethylene-v-triazole 10.8 g. of cyclohexane-1,2-dione-[3-phenylcoumarinyl-(7)-hydrazone]-oxime and 12 g. of anhydrous potassium acetate in 200 g. of acetic acid anhydride are refluxed for 6 hours while excluding moisture. The brown reaction solution is allowed to cool while stirring whereupon the reaction product quickly begins to crystallize out. It is stirred for several hours at room temperature, the product is filtered off under suction and washed 3 times with 20 g. of cold glacial acetic acid. It is then covered with 60 ml. of water, filtered off under suction and then dried in vacuo at 70°. 7.5 g. of 2-[3-phenylcoumarinyl-(7)]-4,5-tetramethylene-v-triazole of the formula

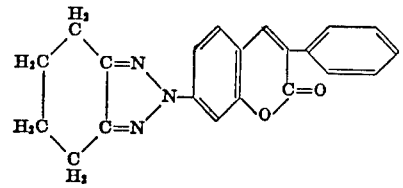

are obtained in the form of pale brown crystals which melt at 245–246°. Almost colorless crystals which melt at 247° are obtained by recrystallizing twice from ethyl acetate.

The v-triazole derivative fluoresces blue-violet in organic solution. It can be used for the brightening of polyvinyl chloride and polyethylene films.

The starting compound used is produced as follows: 10 g. of 3-phenyl-7-hydrazino-coumarin are dissolved in 100 ml. of ethylene glycol monomethyl ether by heating to 55°. After the solution has cooled to 45°, a solution of 5.5 g. of isonitrosocyclohexanone in 20 ml. of ethylene glycol monomethyl ether is added all at once and then a mixture of 10 g. of glacial acetic acid and 10 ml. of water is added. The oxime hydrazone separates immediately from the dark brown reaction mixture in the form of an orange colored, finely crystalline product. The whole is stirred for another 17 hours at 50°, allowed to cool to 30° and the product is filtered off under suction. It is washed three times with 10 ml. of ethylene glycol monomethyl ether and once with 30 ml. of methanol and dried in vacuo at 70°. 9.45 g. of cyclohexane-1,2-dione-[3-phenylcoumarinyl-(7)-hydrazone]oxime are obtained in the form of an orange colored crystalline powder which melts at 229–230° with decomposition.

If, instead of the isonitroso-cyclohexanone, an equivalent amount of 2 - oximino-4-methyl-cyclohexanone is used with otherwise the procedure described above, then, (1.2) 2-[3-phenylcoumarin-(7)-yl]-4,5-(2-methyl)-tetramethylene-v-triazole is obtained.

(1.3) 2 - [3 - phenylcoumarin - (7) - yl]-4,5-(1,3-dimethyl)-tetramethylene-v-triazole is obtained analogously from 2-oximino-3,5-dimethyl-cyclohexanone.

EXAMPLE 2

(2.1) 2 - (3 - phenyl-coumarin-(7)-yl)-4,5-dihydronaphtho[1,2-d]-v-triazole 40.9 g. of Tetralin-1,2-dione-[3-phenyl-coumarin-(7)-yl]-hydrazone]-oxime are dissolved in 400 ml. of pyridine at reflux temperature. A solution of 35.0 g. of copper sulphate pentahydrate in 100 ml. of water is added dropwise to this solution within 2 hours, the reaction mixture being kept under reflux. After two more hours, the dark reaction solution is cooled whereupon the product quickly begins to crystallize out. The mixture is stirred for some hours at room temperature, filtered under suction and the residue is washed with methanol. 2-(3-phenyl-coumarin-(7)-yl)-4,5-dihydronaphtho[1,2-d]-v-triazole oxide is obtained in this way as a brown crystal powder.

20.4 g. of 2-(3-phenyl-coumarin-(7)-yl)-4,5-dihydronaphtho[1,2-d]-v-triazole oxide in 100 ml. of glacial acetic acid are refluxed for 8 hours with 20.0 g. of zinc dust, whereupon the reaction mixture is filtered hot. Yellow crystals separate out of the filtrate on cooling. After recrystallization from chlorobenzene, 2-(3-phenyl-coumarin-(7)-yl)-4,5-dihydronaphtho[1,2-d]-v-triazole, M.P. 216°, is obtained.

The Tetralin - 1,2 - dione - [3 - phenyl-coumarinyl-(7)-hydrazone]-oxime used as starting product is produced as follows:

A solution of 50.4 g. of 3-phenyl-7-hydrazino-coumarin in 150 ml. of methyl Cellosolve is added to a solution of 35.0 g. of β-isonitroso-α-tetralone in 100 ml. of methyl Cellosolve. This reaction mixture is acidified with 100 ml. of a mixture of equal parts of glacial acetic acid and water and then stirred for 12 hours at 80°. Tetralin-1,2-dione - [3 - phenyl - coumarin-(7)-yl)-hydrazone]-oxime separates out in the form of dark brown crystals which melt at over 270°.

If, instead of the 3-phenyl-7-hydrazino-coumarin, an equivalent amount of 3-(4-methylphenyl)-7-hydrazino-coumarin is used with otherwise the same procedure then (2.2) 2 - [3 - (4 - methylphenyl) - coumarin-(7)-yl]-4,5-dihydronaphtho[1,2-d]-v-triazole is obtained.

(2.3) 2 - [3-(4-methoxyphenyl)-coumarin-(7)-yl]-4,5-dihydronaphtho [1,2-d]-v-triazole is obtained analogously from 3-(4-methoxyphenyl)-7-hydrazino-coumarin.

(2.4) 2 - [3-(4-chlorophenyl)-coumarin-(7)-yl]-4,5-dihydronaphtho [1,2-d]-v-triazole is also obtained analogously from 3-(4-chlorophenyl)-7-hydrazino-coumarin.

(2.5) 2 - [3-(4-bromophenyl)-coumarin-(7)-yl]-4,5-dihydronaphtho[1,2-d] - v-triazole is obtained analogously from 3-(4-bromophenyl)-7-hydrazino-coumarin.

(2.6) 2 - [3-(3-ethylphenyl)-coumarin-(6)-yl]-4,5-dihydronaphtho[1,2-d]-v-triazole is obtained analogously from 3-(3-ethylphenyl)-7-hydrazino-coumarin.

(2.7) 2-[3-thienyl-(2)-coumarin-(7)-yl]-4,5-dihydronaphtho[1,2-d]-v-triazole is obtained from 3-[thienyl-(2)]-7-hydrazino-coumarin.

(2.8) 2-[3-furyl-(2)-coumarin-7)-yl]-4,5-dihydronaphtho-[1,2-d]-v-triazole is obtained from 3-[furyl-(2)]-7-hydrazino coumarin.

EXAMPLE 3

(3.1) 2-(3-phenyl-coumarin-(7)-yl)-4,5-dihydro-8-chloro-naphtho[1,2-d]-v-triazole (M.P. 227°)

A solution of 35.0 g. of copper sulphate pentahydrate in 100 ml. of water is added dropwise to an 80–90° hot solution of 44.4 g. of 7-chlorotetralin-1,2-dione-[3-phenyl-coumarin-(7)-yl-hydrazone]-oxime in 450 ml. of pyridine whereupon the whole is refluxed for 2 hours. After cooling, 2 - (3-phenyl-coumarin-(7)-yl)-4,5-dihydro-8-chloronaphtho[1,2-d]-v-triazole separates from the reaction mixture in crystalline form.

20.9 g. of the triazole oxide so obtained in 100 ml. of glacial acetic acid are refluxed for 8 hours with 20.0 g. of zinc dust and then the reaction mixture is filtered hot. 2-(3 - phenyl coumarin - (7)-yl)-4,5-dihydro-8-chloronaphtho[1,2-d]-v-triazole crystallizes in the filtrate in the form of pale yellow needles.

The 7-chlorotetralin-1,2-dione[3-phenyl-coumarin-(7)-yl-hydrazone]-oxime used as starting material is produced as described in Example 2 from 7-chloro-1-tetralone and 3-phenyl-7-hydrazino-coumarin.

If, instead of 7-chloro-1-tetralone, 7-methyl-1-tetralone is used with otherwise the same procedure, then (3.2) 3 - (3-phenyl-coumarin-(7)-yl-4,5-dihydro-8-methylnaphtho[1,2-d]-v-triazole (M.P. 198°) is obtained.

(3.3) 2-(3-phenyl-coumarin-(7)-yl)-4,5-dihydro-5,7,8-trimethyl-naphtho[1,2-d] - v - triazole is obtained analogously from 4,6,7-trimethyl-1-tetralone.

(3.4) 2 - (3-phenyl-coumarin-(7)-yl)-4,5-dihydro-8-methoxynaphtho[1,2-d]-v-triazole is obtained analogously from 7-methoxy-1-tetralone.

EXAMPLE 4

(4.1) 2-(3-phenyl-coumarin-(7)-yl)-4H-indeno[2,3-d]-v-triazole 16.1 g. of oximino-1-indanone and 25.2 g. of 3-phenyl-7-hydrazino-coumarin are dissolved in 150 ml. of methyl Cellosolve, the solution is acidified with 50 ml. of equal parts of glacial acetic acid and water and the whole is stirred for 12 hours at 70°. The oxime hydrazone separates out of the reaction mixture as an orange colored product. It is filtered off and washed with methanol.

20.0 g. of the indan-1,2-dione-[3-phenyl-coumarin-(7)-yl-hydrazone]-oxime so obtained are heated to 90° in 100 ml. of pyridine. A solution of 15.0 g. of copper sulphate pentahydrate in 40 ml. of water is added dropwise within 2 hours to this solution at between 90 and 100°. The reaction mixture is refluxed for another hour and then cooled, whereupon 2 - [3-phenyl coumarin-(7)-yl]-4H-indeno[2,3-d]-v-triazole oxide crystallizes out.

14.3 g. of the triazole oxide so obtained and 10.0 g. of zinc dust in 100 ml. of glacial acetic acid are refluxed for 12 hours. The reaction mixture is then filtered hot and 2 - (3-phenyl-coumarin-(7)-yl)-4H-indeno[2,3-d]-v-triazole crystallizes in the filtrate. The compound melts at 262–263°.

If, instead of 2 - oximino - 1-indanone, 2-oximino-7-chloro-1-indanone is used with otherwise the same procedure, then (4.2) 2 - (3-phenyl-coumarin-(7)-yl)-4H-7-chloro-indeno 2,3-d-v-triazole is obtained.

(4.3) 2-(3-phenyl-coumarino-(7)-yl)-4H-7-methyl-indeno [2,3-d] - v - triazole is obtained analogously from 2-oximino-7-methyl-1-indanone.

EXAMPLE 5

1 g. of the optical brightener obtained according to Example (1.1) is dissolved in 1000 ml. of ethylene glycol monoethyl ether. 1.8 ml. of this stock solution are added to 100 ml. of water containing 0.12 ml. of 85% formic acid and 0.06 g. of octadecyl alcohol-pentadecaglycol ether. The treatment bath is heated to 60°, 3 g. of a nylon staple fabric are introduced, the temperature is raised within 10–15 minutes to 90–92° and the bath is kept for 30 minutes at this temperature. The fabric is rinsed and dried. Compared with untreated fabric, the fabric so treated has clearly a whiter, more brilliant appearance.

EXAMPLE 6

0.4 g. of detergent of the following composition are added to 100 ml. of water:

| | Percent |
|---|---|
| Dodecylbenzene sulphonate | 16 |
| Fatty alcohol sulphonate | 4 |
| Na-tripolyphosphate | 35 |
| Tetra-sodium pyrophosphate | 7 |
| Mg-silicate ($MgSiO_3$) | 2 |
| Na-disilicate ($Na_2(SiO_3)_2$) | 7 |
| Carboxymethyl cellulose | 1 |
| Glaubers salt | 25.5 |
| Water | 2.5 |

1 g. of the optical brightener obtained according to Example (1.1) is dissolved in 1000 ml. of ethylene glycol monoethyl ether. 0.8 ml. of this stock solution are added to the aqueous solution described above. The washing liquor so obtained is heated to 55–60° and 3 g. of a polyethylene glycol terephthalate fabric are added. The fabric is washed for 20 minutes at this temperature, then rinsed and dried. The washed sample of fabric has a higher fluorescence number after the treatment than before washing.

Similar results are obtained with the above procedure if instead of the above brightener, the optical brightener obtained according to Example (2.1) is used.

EXAMPLE 7

0.4 g. of the detergent described in Example 6 are added to 100 ml. of water. 1 g. of the optical brightener described in Example (1.1) is dissolved in 1000 ml. of ethylene glycol monoethyl ether. 1 ml. of this stock solution is added to the aqueous solution described above. The washing liquor is heated to 55–60° and 3 g. of polyamide fabric are introduced. The fabric is washed at this temperature for 20 minutes, then rinsed and dried. Compared with untreated starting material, the fabric so treated has clearly a more white appearance.

If, with the above procedure, the optical brightener obtained according to Example (2.1) is used, then similar results are obtained.

EXAMPLE 8

The procedure given in Example 7 is followed and 1 ml. of a 0.1% solution of the disodium salt of 4,4'-bis-[4 - phenylamino - 6 - (N-methyl - 2 - hydroxyethyl-amino-s-triazinyl - (2) - amino]-stilbene - 2,2'-disulphonic acid, or of the disodium salt of 4,4' - bis-[4-phenylamino-6 - (2 - methoxyethylamino)-s-triazinyl-(2)-amino]-stilbene-2,2'-disulphonic acid or of the disodium salt of 4,4' - bis-[4-phenylamino - 6 - (2-hydroxyethylamino)-s-triazinyl - (2) - amino]-stilbene-2,2'-disulphonic acid or of the sodium salt of 4 - [4,5 - naphtho - (1',2')-triazolyl - (2)] - stilbene - 2 - sulphonic acid is added to the washing liquor. These solutions are produced by dissolving 1 g. of brightener in 1000 ml. of water, optionally with the addition of ethylene glycol monoethyl ether.

In addition to the effects described on polyester and polyamide, if cellulose fabric is present in the washing liquor as well as the synthetic fabric, the cellulose material is also optically brightened.

EXAMPLE 9

0.2 g. of trichlorobenzene are added to 100 ml. of water and a solution of 0.003 g. of the triazole derivative described in Example (2.1) in 3 ml. of ethylene glycol monoethyl ether are added. The liquor so obtained is heated to 60° and 3 g. of a polyester fabric are added. The temperature is raised within 10–15 minutes to 95–98° and kept there for 1 hour. The fabric is then rinsed and dried. Compared with untreated fabric, that treated has clearly a whiter, more brilliant appearance.

If the procedure given in the above example is followed but the v-triazole described in Example (3.1) is used instead of the brightener there mentioned, then similar results are obtained.

EXAMPLE 10

0.3 g. of octadecyl alcohol-pentadecylglycol ether are added to 285 ml. of water and a solution of 0.015 g. of the v-triazole described in Example (2.1) in 15 ml. of ethylene glycol monoethyl ether is added. This aqueous liquor containing optical brightener is heated to 20–30° and 15 g. of a polyester fabric are introduced. The temperature is raised within 30 minutes to 130° and the bath is kept at this temperature for 1 hour. It is then cooled to 60° within 15–20 minutes and the fabric is rinsed and dried. Compared with untreated fabric, that so treated has clearly a whiter, more brilliant appearance.

If the procedure given in this example is followed but the v-triazole obtained according to Example (3.1) is used instead of the brightener mentioned, then similar results are obtained.

EXAMPLE 11

0.2 g. of sulphosuccinic acid dioctyl ester are added to 100 ml. of water. Also a 10% mixture of the optical brightener described in Example (2.1) milled in sand is produced. 3 g. of this sand mixture are added to 3 g. of the aqueous solution described above. Polyester fabric is pad dyed at 20° with this solution and squeezed out to 50–60% moisture content (roller pressure 30 kg./sq. cm., rate 3 meters/minute). The fabric is dried and fixed for 30 seconds at 210°. Compared with untreated fabric, that so treated has clearly a whiter, more brilliant appearance.

Similar results are obtained when the brightener described in Example (2.1) is used instead of that described in Example (4.1).

Also, if a mixed fabric of polyester and cotton is treated as described above instead of the polyester fabric, after an additional bleaching with sodium chlorite, a brilliantly brightened fabric is also obtained.

EXAMPLE 12

0.2 ml. of sulphosuccinic acid dioctyl ester are added to 100 ml. of water. Also a 10% mixture of the v-triazole according to Example (3.1 or (4.1) is produced by milling it with sand. 3 g. of such mixture are added to the aqueous solution described above. Polyester fabric is pad dyed at 20° with this solution (roller pressure 30 kg./sq. cm., rate 3 meters/minute. While still moist, the fabric is steamed for 30 minutes at 2 atm. Compared with uncreated starting material, the fabric so treated has clearly a whiter, more brilliant appearance.

If in the above process, a polyester/cotton mixed fabric is used instead of polyester fabric and then bleaching with sodium chlorite is performed, then a brilliantly brightened fabric is obtained.

EXAMPLE 13

0.2 g. of trichlorobenzene are added to 100 ml. of water. 1 g. of the v-triazole obtained according to Example (2.1) is dissolved in 1000 ml. of ethylene glycol monoethyl ether. 2 ml. of this stock solution are added to the aqueous solution described above. Also, 2 mg. of the optical brightener of the formula

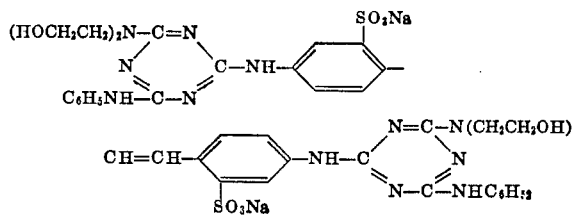

are dissolved in this liquor. This treatmnt bath is heated to 60°, 3 g. of a polyester/cotton mixed fabric are introduced, the tempertaure is raised to 95–98° within 10–15 minutes and the bath is kept at this temperature for 1 hour. The fabric is then rinsed and bleached for 1 hour at 85° in a fresh bath of 100 ml. of an aqueous solution containing 0.3 ml. of $H_2O_2$ (40%), 0.1 ml. of water glass (38° Bé.) and 0.05 ml. of NaOH (36° Bé.). Compared with untreated fabric, that so treated has clearly a whiter, more brilliant appearance. Similar results are obtained when the brightening and bleaching processes are performed in one bath.

In addition, equally good brightening effects are attained if in the above process the optical brightener obtained according to Example (4.1) is used instead of the v-triazole mentioned.

EXAMPLE 14

0.2 g. of sodium nitrate, 0.2 g. of oxalic acid and 3 ml. of a stock solution of brightener according to Example (2.1) are added to 100 ml. of water. The stock solution is produced by dissolving 1 g. of the brightener mentioned in 1000 ml. of ethylene glycol mooethyl ether. 0.2 g. of trichlorobenzene are also added to this aqueous solution. This liquor is heated to 60°, 3 g. of a polyester fabric are introduced, the temperature is raised to 85° within 10–15 minutes and the bath is kept for 30 minutes at this temperature. The temperature is then raised to 98–100° and treatment is continued for another 30 minutes at this temperature. The fabric is rinsed and dried. Compared with the starting material, the fabric so treated has clearly a whiter, more brilliant appearance.

EXAMPLE 15

An aqueous solution of the following composition is produced:

150 g./litre of a reactant resin based on dimethylol ethylene urea,
15 g./litre of $MgCl_2.6H_2O$
20 g./litre of a 10% aqueous dispersion of the v-triazole described in Example (4.1)
1 g./litre of brightener of the formula

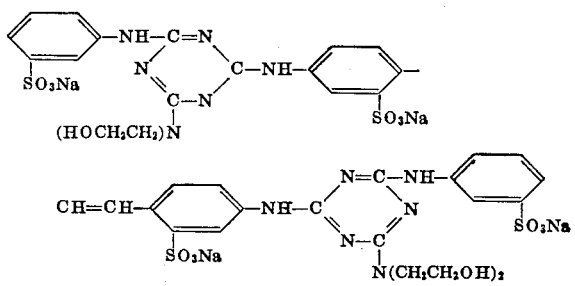

This solution is made up to 1000 ml. with water. Cotton/polyester mixed fabric is pad dyed with this solution (moisture content 50–60%), pre-dried at 100° and then condensed for 5 minutes at 140°. The fabric can subsequently be washed with a soda alkaline washing liquor. Compared with untreated fabric, that so treated has clearly a more white appearance.

If the procedure in this example is followed but instead of the dispersion of the brightener mentioned, a 10% dispersion of the v-triazole according to Example (2.1) is used, then a clearly brightened fabric is also obtained.

EXAMPLE 16

A dry mixture is made of 20 g. of a detergent of the composition given in Example (1.1), 20 mg. of the v-triazole described in Example 3 and 15 mg. of the optical brightener of the formula

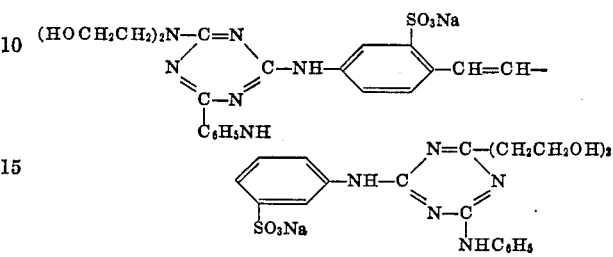

20 ml. of water are then added and the whole is stirred until a homogeneous paste is formed. This paste is dried in a vacuum drying chamber. The dried paste is then pulverized and, in amounts of 1–5 g./litre, it can be used for the brightening of a cotton/polyester mixed fabric.

If in the above process the brightener described in Example (2.1) is used instead of that mentioned, then similar results are obtained.

EXAMPLE 17

0.2 part of the v-triazole described in Example (2.1), 5 parts of titanium dioxide (Anatas), 75 parts of acetyl cellulose and 25 parts of diethyl phthalate are homogenized in 900 parts of acetone to form a cloudy solution which is cast onto glass plates. After evaporation of the acetone, an opaque film which can be drawn off is obtained. It is a much more clear white color than a comparative sample produced without optical brightener.

EXAMPLE 18

500 parts of polyamide chips made from ε-caprolactam, 1.5 parts of titanium dioxide (Anatas) and 0.25 part of the v-triazole described in Example (1.1) are mixed for 10 hours in a rotation mixer. The mixer is then melted in a rust-free steel autocalve at 250–260° while excluding oxygen, extruded through a die by nitrogen pressure and the filament is drawn to 400%. A brilliantly white fibre having good fastness to light is obtained.

EXAMPLE 19

0.06 part of the v-triazole obtained according to Example (2.1) are gelatinized on a set of hot rollers for 15 minutes at 160° with a mixture consisting of 67 parts of polyvinyl chloride powder, 33 parts of dioctyl phthalate, 2 parts of di-n-butyl dilauryl dioxystannate and 0.3 part of sodium pentaoctyl tripolyphosphate, and then drawn into films. In daylight, a polyvinyl chloride film so produced has a violet fluorescence and a clearly more white appearance than corresponding films produced without the addition of the optical brightener.

EXAMPLE 20

0.03 part of the v-triazole described in Example (2.1) and 7 parts of titanium dioxide (Anatas) are worked up with 67 parts of polyvinyl chloride, 33 parts of dioctyl phthalate, 2 parts of dibutyl tin dilaurate and 0.3 part of sodium pentaoctyl tripolyphosphate as described in. Example 26 into an opaque film. The film so produced has a much more white appearance than a comparative sample produced without the addition of optical brightener.

EXAMPLE 21

300 parts of hexamethylenediamine adipate are dissolved in 300 parts of 80° hot distilled water. 1.8 parts of sebacic acid, 1.2 parts of titanium dioxide (Anatas) and 0.3 part of the v-triazole described in Example (2.1) are added to this solution and the whole is stirred until a homogeneous distribution is attained. The liquid mixture is then put, while excluding oxygen, into an autoclave preheated to about 150° and then the temperature is raised within 1 hour to 280°. During this time the pressure in the autoclave is kept below 30 atmospheres by releasing steam. After the maximum temperature of 280–290° has been attained, the pressure is reduced to atmospheric pressure within 10–20 minutes by release of the volatile parts. The mass is then kept at 280° and atmospheric pressure for 4 hours while excluding oxygen. Condensation has proceeded so far after this time that the polycondensate can be spun by nitrogen pressure through a die in the floor of the autoclave. In this way, pure white polyamide threads are obtained.

EXAMPLE 22

400 parts of caprolactam, 40 parts of water, 0.4 part of the v-triazole of the formula

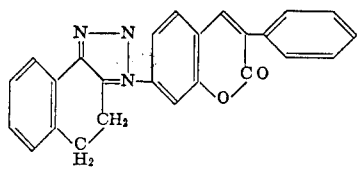

and 1.6 parts of titanium dioxide (Anatas) are mixed together and the mixture is heated to about 70° until it becomes liquid. The liquid mixture is placed in a stainless steel autoclave and heated to a temperature of about 250° within 1 hour while excluding oxygen. There is a pressure of 10–15 atmospheres. After this time, the water is distilled off and, to completely remove gas, the polymeric mass is kept for 3 hours without pressure at 250°. The mass attains a viscosity in this way which enables the polymerisate to be extruded by nitrogen pressure through a die on the floor of the pressure vessel in the form of bands or filaments. Monomeric parts are removed from the solidified polyamide by extraction with water. The polyamide fibre so obtained is distinguished by very high grade whiteness. The optical brightener is fixed wash fast and the polyamide fibres, the appearance of which has been improved, have good fastness to light.

A similar effect is obtained if in the above example, the v-triazole mentioned is replaced by 0.4 part of the compound of the formula

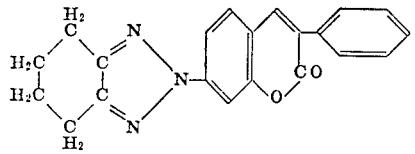

EXAMPLE 23

1000 parts of granulated Nylon 6 and 1 part of finely pulverized 2-[3-phenylcoumarinyl-(7)]-4,5-dihydronaphtho[1,2-d]-v-triazole are mixed for 3 hours in a roller mixer. The granulate is then extruded by means of a screw extruder at a mass temperature of 250° as an endless spiral of 2 mm. diameter and is then granulated. The material so obtained has an improved color of the starting granulate, i.e. it has a high degree of whiteness. It can be further worked up in the usual machines into any shape desired or it can be spun into filaments, which have brilliant whiteness.

If in the above example, instead of 1000 parts of granulated Nylon 6, the same number of parts of Nylon 66 or Terylene are used and the procedure given in the example is followed, then filaments having brilliant whiteness are obtained also.

EXAMPLE 24

388 g. of benzene-1,4-dicarboxylic acid dimethyl ester, 300 g. of 1,2-ethane diol and 0.4 g. of antimony oxide are placed in a high quality steel autoclave fitted with a stirrer, gas inlet tube, vacuum, sloping condenser, die in the floor which can be closed, a charging valve and a heating jacket. The autoclave is heated to an external temperature of 200° while bubbling through nitrogen and is kept for three hours at this temperature while slowly distilling methanol off. Then, 0.2 g. of 2-[3-phenylcourmarinyl-(7)]-4,5-dihydronaphtho[1,2-d]-v-triazole dissolved in 40 g. of 1,2-ethane diol are carefully added through the charging valve while excluding air and having reduced the temperature to 190°. On completion of the addition, the temperature (external) is raised to 285° within half an hour whereupon 1,2-ethane diol distills off. Vacuum is then put on, the pressure is slowly reduced to 0.2 torr and the condensation is completed for 3 hours under these conditions. Vigorous stirring is performed during these operations. The liquid condensation polymer is then extruded by the die in the floor by nitrogen pressure. Rods, bands or monofilaments can be produced from the polymers so obtained. The polyester monofilaments so obtained have a brilliant white appearance.

EXAMPLE 25

1000 parts of polyester granulate obtained from polyterephthalic acid glycol ester are intimately mixed with 0.3 part of the v-triazole obtained according to Example (2.1). The mixture is then melted at 285° while stirring. After spinning the melt extruded through the usual dies under a nitrogen pressure of 2–3 excess atmospheres, very greatly brightened polyester fibres are obtained. The white effects obtained have good fastness to washing and light.

Similarly good white effects are obtained with compounds No. (2.2), (3.1) and (4.1).

EXAMPLE 26

1000 parts of a granulate obtained from polyterephthalic acid-1,4-cyclohexane dimethanol ester are intimately mixed with 0.1 parts of the v-triazole obtained according to Example (2.1) and 0.35 part of titanium dioxide and the mixture is then melted. After spinning the melt through the usual spinning dies under nitrogen pressure, very greatly brightened polyester fibres are obtained.

Similarly good white effects are obtained with compounds No. (2.2), (3.1) and (4.1).

We claim:

1. A compound of the formula:

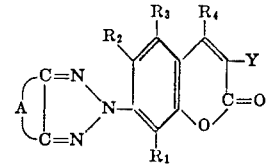

wherein

A represents a tetramethylene group optionally substituted by lower alkyl; or

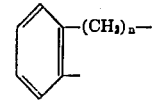

wherein $n$ is 1 or 2, the phenylene residue being optionally substituted by sulphonic acid groups, halogen, lower alkyl or lower alkoxy groups;

Y represents phenyl; or phenyl substituted with methyl, ethyl, halogen, methoxy or ethoxy, or fury-(2); or thienyl-(2); or thienyl-(2) which may be substituted by a low alkyl group; and each of $R_1$ and $R_4$ independently of the other, represents hydrogen or lower alkyl; and each of $R_2$ and $R_3$, independently of the other, represents hydrogen, lower alkyl, or lower alkoxy.

2. A compound as defined in claim 1, where Y represents an unsubstituted phenyl radical or a sumstituted phenyl radical as defined in claim 1.

3. A compound as defined in claim 2, wherein each of $R_1$, $R_2$ and $R_4$ represents hydrogen.

4. A compound as defined in claim 3, wherein A represents tetramethylene or

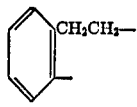

and Y represents phenyl, methylphenyl or chlorophenyl.

5. A compound as defined in claim 4, which is 2-[3-phenyl - coumarin - (7)-yl]-4,5-dihydronaphtho[1,2-d]-v-triazole.

6. A compound as defined in claim 4, which is 2-[3-(4-methylphenyl) - coumarin - (7)-yl]-4,5-dihydronaphtho[1,2-d]-v-triazole.

7. A compound as defined in claim 4, which is 2-[3-phenyl - coumarin - (7)-yl]-4,5-dihydro-8-chloronaphtho[1,2-d]-v-triazole.

8. A compound as defined in claim 4, which is 2-[3-phenyl - coumarin - (7)-yl]-4,5-dihydro-8-methylnaphtho[1,2-d]-v-triazole.

9. A compound as defined in claim 4, which is 2-[3-phenyl-coumarinyl-(7)-4,5-tetramethylene-v-triazole.

10. A compound as defined in claim 4, which is 2-[3-phenyl-coumarin-(7)-yl]-4H-indeno[2,3-d]-v-triazole.

11. A compound of the formula

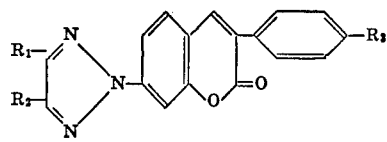

where $R_1$ and $R_2$ are taken together and form —$CH_2$—$CH_2$—$CH_2$—$CH_2$— or

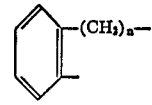

where $n$ is 1 or 2, and $R_3$ is hydrogen, halogen, lower alkyl, or lower alkoxy.

References Cited
UNITED STATES PATENTS 3,271,412    9/1966    Raue et al.    260—308
3,288,801    11/1966    Fleck et al.    260—308

ALTON D. ROLLINS, Primary Examiner

U.S. Cl. X.R.

117—33.5 R; 252—95, 301.2 W; 260—141, 247.1, 247.2 B, 268 BC, 294.3 C, 295 F, 308 B, 332.2 H, 343 R